United States Patent Office.

WILLIAM J. HOOPER AND THEODORE HOOPER, OF BALTIMORE, MARYLAND.

Letters Patent No. 99,896, dated February 15, 1870.

IMPROVEMENT IN TREATING FISH AND ANIMAL MATTERS TO OBTAIN OILS, FATS AND OTHER PRODUCTS.

The Schedule referred to in these Letters Patent and making part of the same.

To all whom it may concern:

Be it known that we, WILLIAM J. HOOPER and THEODORE HOOPER, of the city and county of Baltimore, and State of Maryland, have invented an Improved Process for Treating Fish and Animal Matter to Obtain Oils and Fats and Fertilizers; and we do hereby declare that the following is a correct description thereof.

This invention consists in treating fish and animal substances for rendering or separating their oils and fats and obtaining fertilizers from said fish and animal substances in vacuum pans or suitable apparatus where a vacuum or partial vacuum may be formed by means of a vacuum-producing apparatus or steam-ejectors, and allowing heated air to pass into such pans or apparatus where the vacuum or partial vacuum is made for the purpose hereafter more fully specified.

In order to enable those skilled in the art to apply our invention we will proceed to describe the process.

The fish or animal matter is placed in pans or other suitable apparatus wherein a vacuum or partial vacuum may be made by any of the well-known applications for that purpose.

The vacuum-producing apparatus is kept working, and at the same time hot air or other gases are allowed to pass into said apparatus.

The hot air by this process will more effectually come in contact with the substance placed in the apparatus, thereby causing more rapidly and thoroughly the rendering of the oils or fats, and at the same time eliminating the water and desiccating the substance.

The oils and fats thus rendered are collected and will be found to be of a superior quality.

When a sufficient quantity of oils or fats has been extracted from said substances the solid portion is also taken out of the apparatus and ground or otherwise prepared for a fertilizer.

We well know that it has been proposed to treat fish and other animal matter for rendering their oils or fats and producing a fertilizer therefrom by heated air under pressure; but

What we claim as our invention, and desire to secure by Letters Patent of the United States, is—

The rendering of oils and making fertilizers from fish, and the rendering of fats and making fertilizers from animal substances by treating said fish and animal substances in vacuum or partial vacuum, in connection with hot air or other gases, substantially in the manner and for the purpose as herein set forth.

WILLIAM J. HOOPER.
THEODORE HOOPER.

Witnesses:
ORAZIO LUGO,
JOSEPH McLAUGHLIN.